US012692199B2

(12) United States Patent
Iwasaki et al.

(10) Patent No.: US 12,692,199 B2
(45) Date of Patent: Jul. 28, 2026

(54) CUTTING TOOL

(71) Applicant: SUMITOMO ELECTRIC HARDMETAL CORP., Hyogo (JP)

(72) Inventors: Hirotsugu Iwasaki, Hyogo (JP); Akihiko Ueda, Hyogo (JP); Naoki Watanobe, Hyogo (JP); Takashi Harada, Hyogo (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 588 days.

(21) Appl. No.: 18/038,598

(22) PCT Filed: Nov. 29, 2021

(86) PCT No.: PCT/JP2021/043682
§ 371 (c)(1),
(2) Date: May 24, 2023

(87) PCT Pub. No.: WO2022/114191
PCT Pub. Date: Jun. 2, 2022

(65) Prior Publication Data
US 2024/0001453 A1     Jan. 4, 2024

(30) Foreign Application Priority Data

Nov. 30, 2020    (JP) ................................. 2020-198392

(51) Int. Cl.
*C04B 35/528*        (2006.01)
(52) U.S. Cl.
CPC .................................. *C04B 35/528* (2013.01)

(58) Field of Classification Search
None
See application file for complete search history.

(56) References Cited

U.S. PATENT DOCUMENTS

| | | | | |
|---|---|---|---|---|
| 8,567,531 B2 * | 10/2013 | Belnap | .................... | E21B 10/55 |
| | | | | 175/425 |
| 2010/0088969 A1 * | 4/2010 | Kuroda | ................... | C22C 26/00 |
| | | | | 51/309 |
| 2019/0076920 A1 * | 3/2019 | Ishii | ........................ | C22C 29/00 |

FOREIGN PATENT DOCUMENTS

| | | |
|---|---|---|
| JP | 4-37650 A | 2/1992 |
| JP | H10-217006 A | 8/1998 |

(Continued)

OTHER PUBLICATIONS

Bobrovnitchii et al., "Some peculiarities of the diamond micro-powder sintering", 2003, International Journal of Refractory Metals & Hard Materials, vol. 21, p. 251-258. (Year: 2003).*

(Continued)

*Primary Examiner* — Kim S. Horger
(74) *Attorney, Agent, or Firm* — Renner, Otto, Boisselle & Sklar, LLP

(57) ABSTRACT

A cutting tool includes a rake face, a flank face, and a cutting edge ridge line connecting the rake face and the flank face. A portion of the rake face and a portion of the flank face adjacent to the cutting edge ridge line are made of a diamond sintered body including diamond grains. A dislocation density in the portion of the flank face is $8 \times 10^{15}/m^2$ or less. The diamond grains have an average grain size of 0.1 μm to 50 μm. A content ratio of the diamond grains in the diamond sintered body is 80% by volume to 99% by volume.

9 Claims, 3 Drawing Sheets

100

(56)                     References Cited

FOREIGN PATENT DOCUMENTS

JP          2005-239472  A      9/2005
JP           2016-97452  A       5/2016

OTHER PUBLICATIONS

Pantea. C. et al. High-pressure effect on dislocation density in nanosize diamond crystals. Diamond and Related Materials. 2004. vol. 13. 1753-1756. <doi:10.1016/j .diamond.2004.03 .005> table 1. fig. 3.

Shul'zhenko, A.A. et al., "Structure and Electrophysical Properties of the Diamond-Graphen-Silicon Carbide Composite", Journal of Superhard Materials, Jan. 8, 2019, vol. 40, No. 6, pp. 435-438.

Voronin, G.A. et al., "Properties of nanostructured diamond-silicon carbide composites sintered by high pressure infiltration technique", Journal of Materials Research, Sep. 1, 2004, vol. 19, No. 9, pp. 2703-2707.

Luo, Xiao-Tao et al., "Tailoring the composite interface at lower temperature by the nanoscale interfacial active layer formed in cold sprayed cBN/NiCrAl nanocomposite", Materials & Design, Nov. 28, 2017, vol. 140, pp. 387-399.

T. Ungar and A. Borbely, "The effect of dislocation contrast on x-ray line broadening: A new approach to line profile analysis", Appl. Phys. Lett., vol. 69, No. 21, p. 3173, 1996.

T. Ungar, S. Ott, P. Sanders, A. Borbely, J. Weertman, "Dislocations, grain size and planar faults in nanostructured copper determined by high resolution X-ray diffraction and a new procedure of peak profile analysis", Acta Mater., vol. 46, No. 10, pp. 3693-3699, 1998.

Pantea. C. et al. High-pressure effect on dislocation density in nanosize diamond 1-9 crystals. Diamond and Related Materials. 2004. vol. 13. 1753-1756. <doi: 10.1016/j .diamond.2004.03 .005> table 1. fig. 3.

* cited by examiner

| POWDER PREPARATION STEP | ~S1 |

↓

| POWDER MIXING STEP | ~S2 |

↓

| SINTERING STEP | ~S3 |

↓

| PROCESSING STEP | ~S4 |

CUTTING TOOL

TECHNICAL FIELD

The present disclosure relates to a cutting tool. This application claims priority based on Japanese Patent Application No. 2020-198392 filed on Nov. 30, 2020. The entire contents described in the Japanese Patent Application are incorporated herein by reference.

BACKGROUND

Conventionally, a cutting tool to which a diamond sintered body is applied is known. For example, Japanese Unexamined Patent Application Publication No. 2005-239472 (PTL 1) discloses a high-strength and highly-wear-resistance sintered diamond object comprising sintered diamond particle having an average particle size of at most 2 μm and a binder phase as a remaining portion, wherein content ratio of the sintered diamond particle in the sintered diamond object is at least 80 volume % and at most 98 volume %, wherein the binder phase contains at least one element selected from the group consisting of titanium, zirconium, hafnium, vanadium, niobium, tantalum, chromium, and molybdenum, of which content ratio is at least 0.5 mass % and less than 50 mass %, and contains cobalt, of which content ratio is at least 50 mass % and less than 99.5 mass %, wherein a part of the at least one element or the at least one element as a whole, the element being selected from the group consisting of titanium, zirconium, hafnium, vanadium, niobium, tantalum, chromium, and molybdenum is present as carbide particle having an average particle size of at most 0.8 μm, wherein a texture of the carbide particle is discontinuous, and adjacent the diamond particles are bonded to each other.

PRIOR ART DOCUMENT

Patent Literature

PTL 1. Japanese Unexamined Patent Application Publication No. 2005-239472

SUMMARY

A cutting tool according to the present disclosure includes a rake face, a flank face, and a cutting edge ridge line connecting the rake face and the flank face. Each of a portion of the rake face and a portion of the flank face adjacent to the cutting edge ridge line is made of a diamond sintered body including diamond grains. A dislocation density in the portion of the flank face is $8 \times 10^{15}/m^2$ or less. The diamond grains have an average grain size of 0.1 μm to 50 μm. A content ratio of the diamond grains in the diamond sintered body is 80% by volume to 99% by volume.

DETAILED DESCRIPTION

Figure 1:
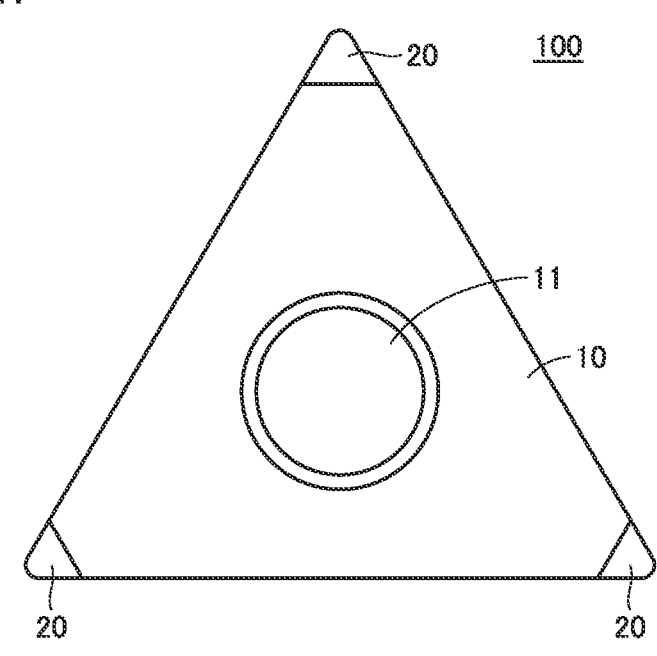
FIG. 1 is a plan view of a cutting insert 100.

Problem to be Solved by the Present Disclosure

When the diamond sintered body of PTL 1 is applied to a cutting tool or the like, wear of flank faces progresses and tool life is shortened in some cases. It is an object of the present disclosure to provide a cutting tool having an improved tool life.

Effects of Present Disclosure

The present disclosure provides a cutting tool with improved tool life.

Outline of Embodiment

First, embodiments of the present disclosure will be listed and explained.

(1) A cutting tool according to one embodiment includes a rake face, a flank face, and a cutting edge ridge line connecting the rake face and the flank face. Each of a portion of the rake face and a portion of the flank face adjacent to the cutting edge ridge line is made of a diamond sintered body including diamond grains. A dislocation density in the portion of the flank face is $8 \times 10^{15}/m^2$ or less. The diamond grains have an average grain size of 0.1 μm to 50 μm. A content ratio of the diamond grains in the diamond sintered body is 80% by volume to 99% by volume.

According to the cutting tool of the above (1), the wear resistance of the flank face is improved by suppressing a decrease in the strength of the diamond grains in the flank face. As a result, the life of the cutting tool is improved.

(2) In the cutting tool according to (1), the dislocation density of the diamond sintered body in the portion of the flank face may be $7 \times 10^5/m^2$ or less.

According to the cutting tool of the above (2), tool life can be further improved. (3) In the cutting tool according to (1) or (2), the diamond sintered body may include a binder. The binder may contain at least one selected from the group consisting of an elemental metal, an alloy, and an intermetallic compound. Each of the elemental metal, the alloy, and the intermetallic compound may contain at least one metal element selected from the group consisting of a group 4 element in the periodic table, a group 5 element in the periodic table, a group 6 element in the periodic table, iron, aluminum, silicon, cobalt, and nickel.

(4) In the cutting tool according to (1) or (2), the diamond sintered body may include a binder. The binder may contain at least one selected from the group consisting of a compound and a solid solution derived from the compound. The compound may consist of at least one selected from the group consisting of an elemental metal, an alloy, and an intermetallic compound and at least one selected from the group consisting of nitrogen, carbon, and oxygen. The elemental metal, the alloy, and the intermetallic compound may contain at least one metal element selected from the group consisting of a group 4 element in the periodic table, a group 5 element in the periodic table, a group 6 element in the periodic table, iron, aluminum, silicon, cobalt, and nickel.

(5) In the cutting tool according to (3) or (4), the binder may contain cobalt.

(6) In the cutting tool according to any one of (1) to (5), a surface roughness Ra in the portion of the rake face may be 120 nm or less.

According to the cutting tool of the above (6), tool life can be further improved. (7) In the cutting tool according to any one of (1) to (6), a dislocation density in the portion of the rake face may be $10 \times 10^{15}/\text{m}^2$ or less.

According to the cutting tool of the above (7), it is possible to reduce the amount of crater wear in the rake face. Therefore, the tool life can be further improved.

In the cutting tool, the dislocation density in the portion of the flank face may be equal to or less than the dislocation density in the portion of the rake face, or may be less than the dislocation density in the portion of the rake face.

(8) The cutting tool according to any one of (1) to (7) may further include a substrate holding the diamond sintered body.

According to the cutting tool of the above (8), while the portion including the cutting edge ridge line is made of the diamond sintered body, the substrate which is the other portion can be made of a material such as a metal material which is less expensive than the diamond sintered body. Therefore, the manufacturing cost of the cutting tool can be reduced.

(9) In the cutting tool according to any one of (1) to (7), an entirety of the rake face and an entirety of the flank face may be made of the diamond sintered body.

According to the cutting tool of the above (9), since the entire surfaces of the rake face and the flank face relating to the tool life are made of the diamond sintered body, it is possible to reliably improve the tool life.

Details of Embodiments

The details of embodiments of the present disclosure will be described with reference to the drawings. In the following drawings, the same or corresponding parts are denoted by the same reference numerals, and redundant description will not be repeated.

A cutting tool according to an embodiment is, for example, a cutting insert 100. The cutting tool according to the embodiment is not limited to cutting insert 100. Hereinafter, cutting insert 100 will be described as an example of the cutting tool according to the embodiment.

Configuration of Cutting Tool According to Embodiment

The configuration of cutting insert 100 will now be described.
<Schematic Configuration of Cutting Insert 100>

Figure 2:
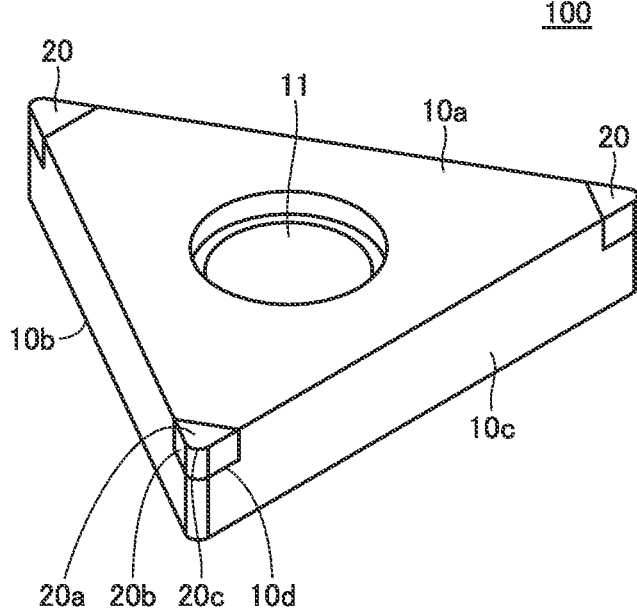
FIG. 2 is a perspective view of cutting insert 100.
Figure 3:
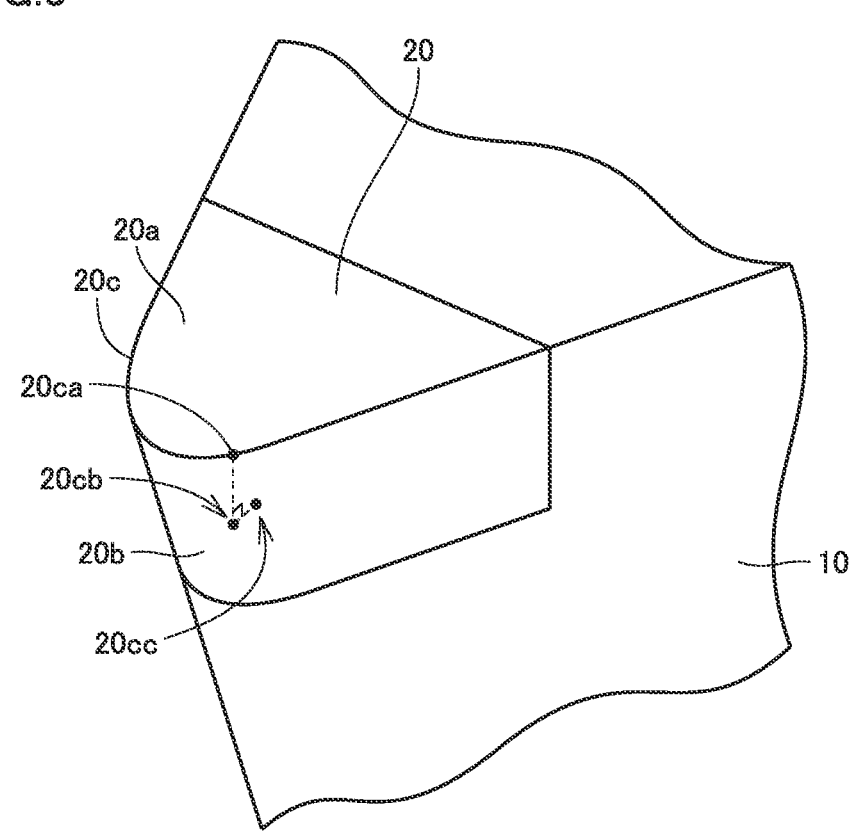
FIG. 3 is an enlarged schematic perspective view of a cutting edge portion 20 of cutting insert 100.
Figure 4:
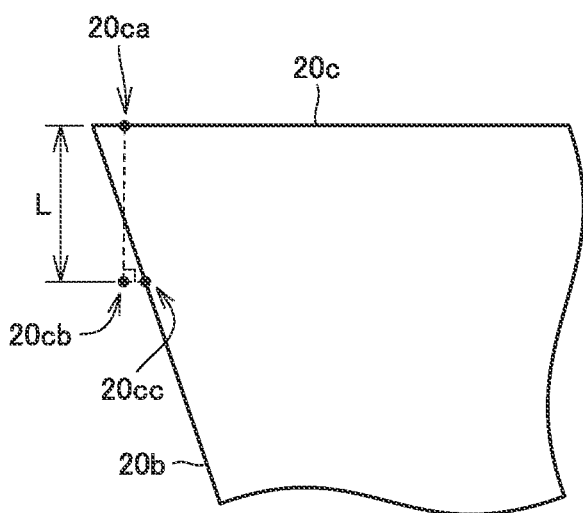
FIG. 4 is an enlarged side face schematic view of cutting edge portion 20 shown in FIG. 3.

FIG. 1 is a plan view of cutting insert 100. FIG. 2 is a perspective view of cutting insert 100. FIG. 3 is an enlarged schematic perspective view showing a cutting edge portion 20 of cutting insert 100. FIG. 4 is an enlarged side face schematic view of cutting edge portion 20 shown in FIG. 3.

As shown in FIGS. 1 and 2, cutting insert 100 includes a substrate 10 and cutting edge portion 20 as a diamond sintered body. Cutting insert 100 has a polygonal shape (e.g., a triangular shape) in a plan view. The polygonal shape (triangular shape) may not be a strict polygonal shape (triangular shape). More specifically, the corners of cutting insert 100 in the plan view may be rounded.

Substrate 10 has a polygonal shape (for example, a triangular shape) in a plan view. Substrate 10 has a top face 10a, a bottom face 10b, and a side face 10c. Top face 10a and bottom face 10b are end faces in a thickness direction of substrate 10. Bottom face 10b is a surface opposite to top face 10a in the thickness direction of substrate 10. Side face 10c is a surface connected to top face 10a and bottom face 10b.

Top face 10a has an attachment portion 10d. Attachment portion 10d is positioned at a corner of top face 10a in a plan view. A distance between top face 10a and bottom face 10b in attachment portion 10d is smaller than a distance between top face 10a and bottom face 10b in portions other than attachment portion 10d. That is, there is a step between attachment portion 10d and the portion of top face 10a other than attachment portion 10d.

A through-hole 11 is formed in substrate 10. Through-hole 11 passes through substrate 10 in the thickness direction. Through-hole 11 is formed at the center of substrate 10 in a plan view. Cutting insert 100 is used for cutting by, for example, inserting a fixing member (not shown) into through-hole 11 and fastening the fixing member to a tool holder (not shown).

Substrate 10 is formed of, for example, a cemented carbide. The cemented carbide is a composite material obtained by sintering carbide particles and a binder. The carbide particles are, for example, particles of tungsten carbide, titanium carbide, tantalum carbide or the like. The binder is, for example, cobalt, nickel, iron or the like. However, substrate 10 may be formed of a material other than the cemented carbide.

Cutting edge portion 20 is attached to attachment portion 10d. Cutting edge portion 20 is attached to substrate 10, for example by brazing. Cutting edge portion 20 includes a rake face 20a, a flank face 20b, and a cutting edge 20c. Rake face 20a is continuous with a portion of top face 10a other than attachment portion 10d. Flank face 20b is continuous with side face 10c. Cutting edge 20c is formed on a ridge line between rake face 20a and flank face 20b.
<Detailed Configuration of Sintered Body of Cutting Edge Portion 20>

Cutting edge portion 20 is formed of a sintered body containing diamond grains and a binder. From a different point of view, in cutting edge portion 20, each of a portion of rake face 20a and a portion of flank face 20b adjacent to cutting edge 20c, which is the cutting edge ridge line, is made of a diamond sintered body including diamond grains.
Dislocation Density of Diamond Sintered Body:

The dislocation density in a portion of flank face 20b is $8 \times 10^{15}/\text{m}^2$ or less. The dislocation density of the diamond sintered body (in particular, a diamond grain) in a portion of flank face 20b may be $7 \times 10^{15}/\text{m}^2$ or less. The dislocation density in a portion of rake face 20a may be $10 \times 10^{15}/\text{m}^2$ or less. The dislocation density in the portion of flank face 20b may be equal to or less than the dislocation density in the portion of rake face 20a, or may be less than the dislocation density in the portion of the rake face 20a.

When the dislocation density of the diamond grains is $8 \times 10^{15}/\text{m}^2$ or less, the occurrence of cracks in the diamond grains is suppressed, a decrease in strength is suppressed, and a diamond sintered body having excellent wear resistance is obtained. In addition, the diamond sintered body has relatively high thermal conductivity. Therefore, it is possible to suppress thermal wear caused by a temperature rise of the cutting edge during cutting. The present inventors have confirmed that a diamond sintered body in which the dislocation density of diamond grains is less than $8.1 \times 10^{13}/\text{m}^2$ cannot be produced. The dislocation density of a portion of flank face 20b may be $8.1 \times 10^{13}/\text{m}^2$ to $8 \times 10^{15}/\text{m}^2$, or may be $8.1 \times 10^{13}/\text{m}^2$ to $7 \times 10^{15}/\text{m}^2$. The dislocation density in a portion of rake face 20a may be $8.1 \times 10^{13}/\text{m}^2$ to $10 \times 10^{15}/\text{m}^2$.

Conventionally, no attention has been paid to the correlation between the dislocation density of diamond grains in a diamond sintered body and the physical properties of the diamond sintered body. Therefore, the inventors of the present invention have conducted intensive studies on the relationship between the dislocation density of diamond grains in a diamond sintered body and the wear resistance of the diamond sintered body. As a result, it has been found for the first time that when the dislocation density of diamond grains is made lower than that of a conventionally existing diamond sintered body, wear during cutting can be suppressed. It is considered that this is because the heat generated during the cutting process can be effectively transmitted to the entire diamond sintered body by reducing the dislocation density, and the wear of the diamond sintered body due to the heat generation can be suppressed. This investigation has revealed that the dislocation density of diamond grains in a conventional diamond sintered body (for example, the diamond sintered body described in PTL 1) is $1.01 \times 10^{16}/\text{m}^2$ or more and less than $1.18 \times 10^{16}/\text{m}^2$.

Here, in the embodiment of the present disclosure, the measurement position of the dislocation density in a portion of flank face 20b is the position adjacent to cutting edge 20c which is the cutting edge ridge line as shown in FIGS. 3 and 4. Specifically, an imaginary point 20cb is set at a position away from an arbitrary position 20ca of cutting edge 20c by a distance L (specifically, 100 m) in a direction perpendicular to rake face 20a. A straight line is drawn from imaginary point 20cb in a direction parallel to rake face 20a and perpendicular to a tangential line at arbitrary position 20ca of cutting edge 20c. An intersection point 20cc between the straight line and flank face 20b is set as a measurement position of the dislocation density.

When the dislocation density is measured for a portion of rake face 20a of cutting edge portion 20, an imaginary line is drawn along cutting edge 20c at a position away from cutting edge 20c by a certain distance (specifically, 100 μm) in rake face 20a, and an arbitrary position on the imaginary line is set as a measurement position.

In the present specification, the dislocation density of the diamond sintered body is measured in a large synchrotron radiation facility (e.g., Kyushu Synchrotron Light Research Center (Saga Prefecture)). Specifically, it is measured by the following method.

Cutting edge portion 20 as a test body made of a diamond sintered body is prepared. In cutting edge portion 20, the observation surface (rake face 20a and a flank face 20b) of the test body including the above-described measurement position is mirror-polished using a diamond slurry having an average grain size of 3 μm, and then immersed in hydrochloric acid for 72 hours. As a result, the binder phase is dissolved in hydrochloric acid on the observation surface of the test body, and diamond grains remain.

With respect to the measurement position of the test body, X-ray diffraction measurement is performed under the following conditions to obtain line profiles of diffraction peaks from respective orientation planes of (111), (220), (311), (331), (422), (440), and (531) which are main orientations of diamond.

X-Ray Source: Synchrotron Radiation

Instrument condition: Detector NaI (cut off fluorescence by appropriate ROI).

Energy: 18 keV (wavelength: 0.6888 Å)

Spectroscopic crystal: Si (111)

Entrance slit: width 3 mm×height 0.5 mm

Light-receiving slit: double slit (width 3 mm×height 0.5 mm)

Mirror: platinum-coated mirror

Incident angle: 2.5 mrad

Scanning method: 2θ-θ scan

Measured peaks: 7 peaks of diamond at (111), (220), (311), (331), (422), (440), and (531). However, when it is difficult to obtain a profile due to texture, orientation, or the like, the peak of the plane index is excluded.

Measurement condition: The number of measurement points is 9 or more in the full width at half maximum corresponding to each measurement peak. The peak top intensity is 2000 counts or more. Since the trail of the peak is also used for analysis, the measurement range is set to about 10 times the full width at half maximum.

The line profile obtained by the above-described X-ray diffraction measurement has a shape including both a true broadening caused by a physical quantity such as non-uniform strain of the test body and a broadening caused by the instrument. In order to obtain the non-uniform strain and the crystallite size, a component caused by the instrument is removed from the measured line profile to obtain a true line profile. The true line profile is obtained by fitting the obtained line profile and the line profile caused by the instrument with a pseudo Voigt function and subtracting the line profile caused by the instrument. $\text{LaB}_6$ is used as a standard sample for removing the instrumental broadening. In addition, when radiation light having a high degree of parallelism is used, the diffraction line broadening caused by the instrument can be regarded as 0.

The dislocation density is calculated by analyzing the obtained true line profile using a modified Williamson-Hall method and a modified Warren-Averbach method. The modified Williamson-Hall method and the modified Warren-Averbach method are known line profile analysis methods that have been used to determine dislocation density.

A formula of the modified Williamson-Hall method is represented by the following formula (I).

[Formula 1]

$$\Delta K = \frac{0.9}{D} + \left( \frac{\pi M^2 b^2}{2} \right)^{1/2} \rho^{1/2} K C^{1/2} + O(K^2 C) \tag{I}$$

In the above formula (I), $\Delta K$ represents the half width of the line profile. D represents a crystallite size. M represents a placement parameter. b represents a Burgers vector. $\rho$ represents dislocation density. K represents a scattering vector. $O(K^2 C)$ represents a higher order term of $K^2 C$. C represents an average value of a contrast factor.

C in the above formula (I) is represented by the following formula (II):

$$C = C_{h00} \left[ 1 - q \left( h^2 k^2 + h^2 l^2 + k^2 l^2 \right) / \left( h^2 + k^2 + l^2 \right)^2 \right]. \tag{II}$$

In the above formula (II), the contrast factor $C_{h00}$ and the coefficient q related to the contrast factor in each of the helical dislocation and the edge dislocation are obtained by using the calculation code ANIZC, assuming that the slip system is <110>{111}, the elastic stiffness of $C_{11}$ is 1076 GPa, $C_{12}$ is 125 GPa, and $C_{44}$ is 576 GPa. In the above formula (II), h, k and l each correspond to the Miller indices (hkl) of diamond. The contrast factor $C_{h00}$ is 0.183 for the helical dislocation, and 0.204 for the edge dislocation. The coefficient q for the contrast factor is 1.35 for the helical dislocation, and 0.30 for the edge dislocation. The helical dislocation ratio is fixed at 0.5, and the edge dislocation ratio is fixed at 0.5.

Further, the relationship of the following formula (III) exists between dislocation and non-uniform strain by using a contrast factor C. In the following formula (III), $R_e$ represents an effective radius of dislocation. $\varepsilon(L)$ represents a non-uniform strain.

$$<\varepsilon(L)^2> = (\rho Cb^2/4\pi)\ln\,(R_e/L). \quad (III)$$

The relationship of the above formula (III) and the formula of Warren-Averbach, it can be expressed as the following equation (IV), and the dislocation density $\rho$ and the crystallite size can be obtained as the modified Warren-Averbach method. In the following formula (IV), A(L) represents a Fourier series. $A^S(L)$ represents the Fourier series for the crystallite size. L represents a Fourier length.

$$lnA(L) = lnA^S(L) - (\pi L^2 \rho b^2/2)\ln\,(R_e/L)(K^2 C) + O(K^2 C)^2 \quad (IV)$$

The details of the modified Williamson-Hall method and the modified Warren-Averbach method are described in "T. Ungar and A. Borbely," The effect of dislocation contrast on x-ray line broadening: A new approach to line profile analysis", Appl. Phys. Lett., vol. 69, no. 21, p. 3173, 1996." and "T. Ungar, S. Ott, P. Sanders, A. Borbely, J. Weertman, "Dislocations, grain size and planar faults in nanostructured copper determined by high resolution X-ray diffraction and a new procedure of peak profile analysis", Acta Mater., vol. 46, no. 10, pp. 3693-3699, 1998."

The present inventors have confirmed that as long as the dislocation density of diamond grains is measured in the same sample, there is almost no variation in the measurement results even when the position of measurement area is changed and the calculation is performed a plurality of times. In other words, the present inventors consider that the measurement results are not intentional even when the measurement field of view are arbitrarily set.

In an embodiment of the present disclosure, the diamond sintered body includes a binder. The binder may include at least one selected from the group consisting of an elemental metal, an alloy, and an intermetallic compound. Each of the elemental metal, the alloy, and the intermetallic compound may contain at least one metal element selected from the group consisting of a group 4 element in the periodic table, a group 5 element in the periodic table, a group 6 element in the periodic table, iron, aluminum, silicon, cobalt, and nickel (hereinafter, also referred to as "group A").

Further, the binder may contains at least one selected from the group consisting of a compound and a solid solution derived from the compound. The compound may consist of at least one selected from the group consisting of an elemental metal, an alloy, and an intermetallic compound and at least one selected from the group consisting of nitrogen, carbon, and oxygen (hereinafter also referred to as "group B"). Each of the elemental metal, the alloy, and the intermetallic compound may contain at least one metal element selected from the group consisting of a group 4 element in the periodic table, a group 5 element in the periodic table, a group 6 element in the periodic table, iron, aluminum, silicon, cobalt, and nickel.

In other words, the binder may be in any one of the following forms (a) to (f):

(a) The binder consists of at least one selected from the group consisting of an elemental metal, an alloy, and an intermetallic compound each containing at least one metal element selected from the group A.

(b) The binder contains at least one selected from the group consisting of an elemental metal, an alloy, and an intermetallic compound each containing at least one metal element selected from the group A.

(c) The binder consists of at least one selected from the group consisting of a compound consisting of at least one metal element selected from the group A and at least one non-metal element selected from the group B, and a solid solution derived from the compound.

(d) The binder contains at least one selected from the group consisting of a compound consisting of at least one metal element selected from the group A and at least one non-metal element selected from the group B, and a solid solution derived from the compound.

(e) The binder consists of at least one selected from the group consisting of: at least one selected from the group consisting of an elemental metal, an alloy, and an intermetallic compound each containing at least one metal element selected from the group A; a compound consisting of at least one metal element selected from the group A and at least one non-metal element selected from the group B; and a solid solution derived from the compound.

(f) The binder contains at least one selected from the group consisting of: at least one selected from the group consisting of an elemental metal, an alloy, and an intermetallic compound each containing at least one metal element selected from the group A; a compound consisting of at least one metal element selected from the group A and at least one non-metal element selected from the group B; and a solid solution derived from the compound.

The group 4 elements in the periodic table include, for example, titanium (Ti), zirconium (Zr), and hafnium (Hf). The group 5 elements in the periodic table include, for example, vanadium (V), niobium (Nb), and tantalum (Ta). The group 6 elements in the periodic table include, for example, chromium (Cr), molybdenum (Mo), and tungsten (W).

In an aspect of the embodiment, the binder preferably includes at least one selected from the group consisting of cobalt, titanium, iron, tungsten, and boron, and more preferably includes cobalt. The binder may contain titanium in addition to cobalt. The component having the highest content in the binder is preferably cobalt.

The composition of the binder contained in the diamond sintered body can be specified by below-described EDX which is provided for SEM.

The average grain size of diamond grains in the sintered body which constitutes cutting edge portion 20 is preferably 0.1 μm to 50 μm. The average grain size of the diamond grains may be 0.2 μm to 40 μm. When the average grain size of the diamond grains is 0.1 μm or more, the diamond grains are densely sintered, and a diamond sintered body having excellent chipping resistance is obtained. When the average grain size of the diamond grains is 50 μm or less, the diamond sintered body has no anisotropy and is excellent in cutting stability when used as a cutting edge of a cutting tool.

In the embodiment of the present disclosure, the average grain size of the diamond grains means a value obtained by measuring a median diameter d50 of a plurality of diamond grains in each of five measurement fields randomly selected, and calculating the average value thereof. Specifically, the average grain size of diamond grains in the sintered body constituting cutting edge portion 20 is calculated by the following method.

In the calculation of the average grain size of diamond grains in the sintered body constituting cutting edge portion 20, first, a sample including a cross section is cut out from an arbitrary position of cutting edge portion 20. The cutting of the sample is performed using, for example, a focused ion beam apparatus, a cross polisher apparatus, or the like.

Second, the cross section of the cut sample is observed with a scanning electron microscope (SEM). By this observation, a backscattered electron image (hereinafter referred to as an "SEM image") of the cross section of the cut sample is obtained. In the observation by the SEM, the magnification is adjusted so that 100 or more diamond grains are included in the measurement visual field. SEM images are acquired at five locations within the cross section of the cut sample.

Third, image processing is performed on the SEM image so that a distribution of grain sizes of diamond grains included in the measurement visual field is acquired. This image processing is performed using, for example, Win ROOF ver. 7.4.5, WinROOF2018 manufactured by MITANI CORPORATION, or the like. The grain size of each diamond grain is obtained by calculating an equivalent circle diameter from the area of each diamond grain obtained as a result of image processing. When the distribution of grain sizes of diamond grains is obtained, diamond grains being partially outside the measurement visual field are not taken into consideration.

Fourth, median diameter d50 of the diamond grains included in the measurement visual field is determined from the distribution of the grain sizes of the diamond grains included in the measurement visual field obtained as described above. A value obtained by averaging the determined median diameters d50 for the five SEM images is regarded as the average grain size of diamond grains in the sintered body constituting cutting edge portion 20.

The content ratio (% by volume) of diamond grains in the sintered body constituting cutting edge portion 20 is preferably 80% by volume to 99% by volume. The content ratio (% by volume) of the diamond grains in the diamond sintered body can be confirmed performing structural observation, elemental analysis, and the like on the diamond sintered body using an energy dispersive X-ray analyzer (EDX) (Octane Elect EDS system) (hereinafter also referred to as "SEM-EDX") attached to a scanning electron microscope (SEM) ("JSM-7800F" (trade name) manufactured by JEOL Ltd.). Specifically, the content ratio of diamond grains in the sintered body constituting cutting edge portion 20 is calculated by the following method.

In the calculation of the content ratio (ratio) of diamond grains in the sintered body constituting cutting edge portion 20, first, a sample including a cross section is cut out from an arbitrary position of cutting edge portion 20. The cutting of the sample is performed using, for example, a focused ion beam apparatus, a cross polisher apparatus, or the like.

Second, the cross section of the cut sample is observed by SEM. By this observation, an SEM image of the cross section of the cut sample is obtained. In the observation by the SEM, the magnification is adjusted so that 100 or more diamond grains are included in the measurement visual field. SEM images are acquired at five locations within the cross section of the cut sample.

Third, the ratio of diamond grains included in the measurement visual field is calculated by performing image processing on the SEM image. This image processing is performed by performing binarization processing of the SEM image using, for example, Win ROOF ver. 7.4.5, WinROOF2018 manufactured by MITANI CORPORATION, or the like. The dark field in the SEM image after the binarization processing corresponds to a region where diamond grains are present. A value obtained by dividing the area of the dark field by the area of the measurement region is considered to be the volume ratio of diamond grains in the sintered body constituting cutting edge portion 20.

In the cutting tool of the embodiment of the present disclosure, the surface roughness Ra of a portion of rake face 20a at cutting edge portion 20 may be 120 nm or less. The surface roughness Ra of a portion of rake face 20a may be 55 nm or less. The surface roughness Ra can be measured using, for example, a laser microscope. The measurement position of the surface roughness Ra is the same position as the measurement position of the dislocation density.

In the present specification, the "surface roughness Ra" refers to the arithmetic average roughness Ra defined in JIS B 0601, and is defined as a value obtained by extracting a reference length from a roughness curve in the direction of the average line, summing the distances (absolute values of deviations) from the average line to the measurement curve of the extracted portion, and averaging using the sum.

Modification

Figures 5, 6:
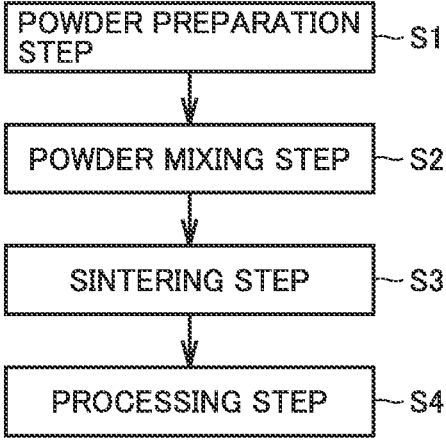
FIG. 5 is a schematic perspective view showing cutting edge portion 20 used as a cutting insert.
FIG. 6 is a flow chart showing a method of manufacturing a cutting insert.

Unlike cutting insert 100 shown in FIGS. 1 to 4, a cutting tool according to an embodiment of the present disclosure may be entirely made of a diamond sintered body. FIG. 5 is a schematic perspective view showing cutting edge portion 20 used as a cutting insert.

Cutting edge portion 20 shown in FIG. 5 is entirely made of a diamond sintered body, and cutting edge portion 20 itself is used as a cutting insert. From a different point of view, in the cutting tool shown in FIG. 5, each of an entirety of rake face 20a and an entirety of flank face 20b is made of the diamond sintered body.

<Method of Manufacturing Cutting Insert>

In order to realize cutting insert 100 as the cutting tool of the embodiment of the present disclosure, it is necessary to obtain a diamond sintered body having a sufficiently low dislocation density as the diamond sintered body to be cutting edge portion 20, and to perform processing so as to avoid an increase in dislocation density by reducing a processing load on the diamond sintered body in the processing step for forming flank face 20b or rake face 20a on the diamond sintered body. Hereinafter, an example of a method of manufacturing cutting insert 100 will be described. FIG. 6 is a flow chart showing a method of manufacturing cutting insert 100. As shown in FIG. 6, the method of manufacturing cutting insert 100 including cutting edge portion 20 includes a powder preparation step S1, a powder mixing step S2, and a sintering step S3 which are steps of manufacturing a sintered body constituting cutting edge portion 20, and a processing step S4 including a step of processing flank face 20b and rake face 20a and a step of fixing cutting edge portion 20 to substrate 10.

In powder preparation step S1, a raw material powder of diamond grains (hereinafter also referred to as "diamond powder") and a raw material powder of a binder (hereinafter, also referred to as "binder raw material powder") is prepared. The diamond powder is not particularly limited, and a known diamond grain can be used as a raw material powder.

The average grain size of the diamond powder is not particularly limited, and can be, for example, 0.1 μm to 50 μm.

The binder raw material powder is not particularly limited as long as it is a powder containing elements constituting the binder. Examples of the binder raw material powder include a cobalt powder and a titanium powder. As the binder raw material powder, one kind of powder may be used alone or a plurality of kinds of powders may be used in combination depending on the composition of the intended binder phase.

In powder mixing step S2, the diamond powder and the binder raw material powder are mixed. This mixing is carried out using, for example, an attritor or a ball mill. However, the mixing method is not limited thereto. The mixing method may be a wet method or a dry method. Hereinafter, a mixture of the diamond powder, the binder raw material powder and a boron powder is referred to as "mixed powder". At this time, the diamond powder and the binder raw material powder may be mixed at an arbitrary mixing ratio so that the content ratio of diamond grains in the diamond sintered body falls within the above-mentioned range.

In sintering step S3, the mixed powder is sintered. The sintering is performed by placing the mixed powder in a container and holding the mixed powder at a predetermined sintering temperature under a predetermined sintering pressure. The container is formed of a high melting point metal such as tantalum or niobium in order to prevent impurities from being mixed into the mixed powder (sintered body). Sintering step S3 in the embodiment of the present disclosure includes a step S31 of sintering the mixed powder and a step S32 of reducing dislocation in diamond grains described later.

In the step S31 of sintering the mixed powder, the mixed powder is sintered at a sintering temperature of 1400° C. to 1550° C. for a sintering time of 15 minutes to 60 minutes under a sintering pressure of 4 GPa or more and less than 5 GPa.

In the embodiment of the present disclosure, the route from the state of room temperature (23±5° C.) and atmospheric pressure to the state of the above sintering pressure and sintering temperature is not particularly limited.

The high-pressure and high-temperature generator used in the method of producing a diamond sintered body of the embodiment of the present disclosure is not particularly limited as long as the target pressure and temperature conditions can be obtained. From the viewpoint of enhancing productivity and workability, the high-pressure and high-temperature generator is preferably a belt-type high-pressure and high-temperature generator. The container for storing the mixed powder is not particularly limited as long as it is made of a material resistant to high pressure and high temperature, and for example, tantalum (Ta), niobium (Nb) or the like is preferably used.

In order to prevent impurities from being mixed into the diamond sintered body, for example, the mixed powder is first put into a capsule made of a high melting point metal such as Ta or Nb, heated in a vacuum, and sealed to remove adsorbed gas and air from the mixed powder. After that, it is preferable to perform the step S31 of sintering the mixed powder described above and the step S32 of reducing dislocation in diamond grains described below. For example, after the step S31 of sintering the mixed powder, it is preferable to perform the step S32 of reducing dislocation in the diamond grains continuously without modification, i.e., without taking out the mixed powder from the capsule made of the high melting point metal.

The sintering pressure is preferably 4 GPa or more and lower than 5 GPa, and more preferably 4.5 GPa or more and lower than 5 GPa.

The sintering temperature is preferably 1400° C. to 1550° C., more preferably 1450° C. to 1550° C.

The sintering time is preferably 15 minutes to 60 minutes, more preferably 15 minutes to 20 minutes.

In the step S32 of reducing dislocation in the diamond grains, the mixed powder is heated at a holding temperature of 1600° C. to 1900° C. for a holding time of 50 minutes to 190 minutes under a holding pressure of 6.5 GPa to 8 GPa to reduce dislocation in the diamond grains. This results in the diamond sintered body of the present disclosure. The present inventors consider that this step promotes the dissolution and re-precipitation reaction of diamond, but the re-precipitated diamond grains have less dislocation, and thus a diamond sintered body having less dislocation is obtained.

The holding pressure is preferably 6.5 GPa to 8 GPa, more preferably 6.5 GPa to 7 GPa.

The holding temperature is preferably 1600° C. to 1900° C., more preferably 1600° C. to 1700° C.

The holding time is preferably 50 minutes to 190 minutes, more preferably 60 minutes to 180 minutes.

In processing step S4, the diamond sintered body obtained in sintering step S3 is processed to be formed into the shape of cutting edge portion 20. Also, cutting edge portion 20 is attached to substrate 10. Cutting insert 100 can be obtained in this way.

In processing step S4, flank face 20b and rake face 20a of cutting edge portion 20 are processed. At this time, flank face 20b or rake face 20a which is the surface to be processed is processed with a reduced processing load. As a result, it is possible to suppress an increase in dislocation density of flank face 20b or rake face 20a due to the processing. As the processing method with a reduced processing load, for example, low-output laser processing, polishing processing with a reduced processing load, or the like can be used.

Effects of Cutting Tool According to Embodiment

Hereinafter, effects of cutting insert 100 will be described.

In cutting insert 100 according to the embodiment of the present disclosure, since the dislocation density of the diamond grains in flank face 20b is $8{\text -}10^5/m^2$ or less, which is smaller than that in a conventional flank face, a decrease in strength due to an increase in the dislocation density of the diamond grains constituting flank face 20b is suppressed. As a result, the wear resistance of flank face 20b is improved, thereby improving the lifetime of cutting insert 100.

In addition, by setting the dislocation density in a portion of rake face 20a of cutting insert 100 to be $10 \times 10^{15}/m^2$ or less, it is possible to reduce the amount of crater wear in rake face 20a. Furthermore, the tool life can be further improved by setting the surface roughness Ra of rake face 20a to be 120 nm or less. Further, by setting the surface roughness Ra of rake face 20a to be 55 nm or less, the effect of improving the tool life can be further enhanced.

EXAMPLES

A cutting test performed to confirm the effect of cutting insert 100 will be described.

<Sample>

Table 1 and Table 2 show conditions of samples which are cutting edge portions made of diamond sintered bodies subjected to the cutting test. As shown in Table 1, samples 1 to 17 were subjected to the cutting test.

Here, a condition A1 is that the dislocation density in a portion of the flank face of each sample is $8 \times 10^{15}/m^2$ or less. A condition A2 is that the dislocation density of the diamond sintered body in the portion of the flank face is $7 \times 10^{15}/m^2$ or less. A condition A3 is that the dislocation density of the diamond sintered body in the portion of the flank face is $6 \times 10^{15}/m^2$ or less.

A condition B1 is that the average grain size of diamond grains in each sample is 0.1 μm to 50 μm. A condition C1 is that the content ratio of diamond grains in each sample is 80% by volume to 99% by volume.

A condition D1 is that the surface roughness Ra of a portion of the rake face of each sample is 120 nm or less. A condition D2 is that the surface roughness Ra of a portion of the rake face of each sample is 55 nm or less. A condition E1 is that the dislocation density in a portion of the rake face of each sample is $10 \times 10^{15}/m^2$ or less. A condition E2 is that the dislocation density in the portion of the rake face is $6 \times 10^{15}/m^2$ or less.

TABLE 1

| | Diamond Grain | | Binder (Binder Phase) | |
| | | | Weight Ratio of | Composition of Binder Phase |
| | Average Grain Size(μm) | Volume Ratio (vol %) | Materials in Raw Material Powder (Co:Ti) | in Sintered Material (Weight Ratio) (Co:Ti:W) |
| --- | --- | --- | --- | --- |
| Sample 1 | 0.5 | 90 | 75:25 | 83:15:2 |
| Sample 2 | 0.5 | 90 | 75:25 | 83:15:2 |
| Sample 3 | 0.5 | 90 | 75:25 | 83:15:2 |
| Sample 4 | 0.5 | 90 | 75:25 | 83:15:2 |
| Sample 5 | 0.5 | 90 | 75:25 | 83:15:2 |
| Sample 6 | 0.5 | 90 | 75:25 | 83:15:2 |
| Sample 7 | 0.5 | 90 | 75:25 | 83:15:2 |
| Sample 8 | 0.5 | 90 | 75:25 | 83:15:2 |
| Sample 9 | 0.5 | 90 | 75:25 | 83:15:2 |
| Sample 10 | 0.5 | 90 | 75:25 | 83:15:2 |
| Sample 11 | 0.5 | 81 | 75:25 | 83:15:2 |
| Sample 12 | 45 | 90 | 75:25 | 83:15:2 |
| Sample 13 | 52 | 90 | 75:25 | 83:15:2 |
| Sample 14 | 0.5 | 79 | 75:25 | 83:15:2 |
| Sample 15 | 0.5 | 81 | 75:25 | 83:15:2 |
| Sample 16 | 0.5 | 95 | 75:25 | 83:15:2 |
| Sample 17 | 0.5 | 99.2 | 75:25 | 83:15:2 |

TABLE 2

| | Dislocation Density of Sintered Material $(10^{15}/m^2)$ | Dislocation Density of Tool Flank Face $(10^{15}/m^2)$ | Dislocation Density of Tool Rake Face $(10^{15}/m^2)$ | Rake Face Ra (nm) | Flank Face Laser Processing Output (W) | Rake Face Polishing Load (kg) | Rake Face Polishing Grinding Wheel Grit Size |
| --- | --- | --- | --- | --- | --- | --- | --- |
| Sample 1 | 1.2 | 6 | 6 | 50 | 0.5 | 1 | #2000 |
| Sample 2 | 1.2 | 7.5 | 6 | 50 | 3 | 1 | #2000 |
| Sample 3 | 1.2 | 8.2 | 6 | 50 | 40 | 1 | #2000 |
| Sample 4 | 1.2 | 6 | 10 | 55 | 1.5 | 30 | #2000 |
| Sample 5 | 1.2 | 6 | 10 | 120 | 0.5 | 30 | #1400 |
| Sample 6 | 1.2 | 7.5 | 10 | 55 | 3 | 30 | #2000 |
| Sample 7 | 1.2 | 8.2 | 10 | 55 | 40 | 30 | #2000 |
| Sample 8 | 1.2 | 6 | 6 | 10 | 0.5 | 1 | #3000 |
| Sample 9 | 1.2 | 6 | 6 | 20 | 0.5 | 1 | #2500 |
| Sample 10 | 1.2 | 6 | 6 | 180 | 0.5 | 1 | #1000 |
| Sample 11 | 1.2 | 6 | 6 | 300 | 0.5 | 1 | #400 |
| Sample 12 | 2 | 6.5 | 6 | 55 | 0.5 | 1 | #2000 |
| Sample 13 | 2 | 6.5 | 6 | 55 | 0.5 | 1 | #2000 |
| Sample 14 | 2 | 6.5 | 6 | 55 | 0.5 | 1 | #2000 |
| Sample 15 | 2 | 6.5 | 6 | 55 | 0.5 | 1 | #2000 |
| Sample 16 | 2 | 6.5 | 6 | 55 | 0.5 | 1 | #2000 |
| Sample 17 | 2 | 6.5 | 6 | 55 | 0.5 | 1 | #2000 |

Samples 1, 2, 4, 5, 6, and 8 to 17 satisfied condition A1. Samples 1, 4, 5, and 8 to 17 also satisfied condition A2. Samples 1, 4, 5, and 8 to 11 also satisfied condition A3.

Condition E1 was satisfied in all samples 1 to 17. Samples 1 to 3 and 8 to 17 also satisfied condition E2.

Sample 13 did not satisfy condition B1. Sample 14 or sample 17 did not satisfy condition C1. Samples 10 or 11 did not satisfy condition D1.

<Test Method>

In the cutting test, a first test method, a second test method, and a third test method were used. The first test method was used for evaluation of samples 1 to 7, the second test method was used for evaluation of samples 8 to 11, and the third test method was used for evaluation of samples 12 to 17. Table 3 shows details of the first test method, the second test method, and the third test method.

TABLE 3

| Cutting Evaluation | Processing Method | Workpiece Material | Workpiece Size (mm) | Holder or Cutter | Cutting insert |
|---|---|---|---|---|---|
| First Test Method | Milling | Quartz Glass | 120 × 120 × 120 | Compliant with RF4160R Manufactured by Sumitomo Electric Industries | Compliant with SNEW1204ADFR Manufactured by Sumitomo Electric Industries |
| Second Test Method | Turning | Glass-Filler-Containing Resin | φ80 × 160 (Outer Diameter Cutting) | Compliant with CSRP R3225-N12 Manufactured by Sumitomo Electric Industries | Compliant with SPGN120304 Manufactured by Sumitomo Electric Industries |
| Third Test Method | Milling | Glass-Filler-Containing Resin | 80 × 80 × 80 | Compliant with RF4060R Manufactured by Sumitomo Electric Industries | Compliant with SNEW1204ADFR Manufactured by Sumitomo Electric Industries |

| Cutting Evaluation | Feed (Turning: mm/rev.) (Milling: mm/L) | Depth of Cut (mm) | Coolant | Life Determination Criterion |
|---|---|---|---|---|
| First Test Method | 0.18 | 0.35 | DRY | Cutting Volume Until Average Flank Face Wear Width Reaches 250 μm |
| Second Test Method | 0.15 | 0.45 | WET | Cutting Distance Until Average Flank Face Wear Width Reaches 200 μm |
| Third Test Method | 0.24 | 0.55 | DRY | Cutting Volume Until Average Flank Face Wear Width Reaches 250 μm |

<Results>

Table 4 shows the results of the cutting test. As shown in Table 4, Samples 1, 2, 4 to 6, 8 to 12, 15, and 16 exhibited relatively long tool life. On the other hand, in samples 3, 7, 13, 14, and 17, chipping occurred in each cutting edge portion 20 at the beginning of the cutting process (hereinafter, referred to as "initial chipping").

TABLE 4

| | Evaluation Method | Tool Life (Milling: cm³) (Turning: km) |
|---|---|---|
| Sample 1 | First Test Method | 6000 |
| Sample 2 | First Test Method | 4500 |
| Sample 3 | First Test Method | Initial Chipping |
| Sample 4 | First Test Method | 5000 |
| Sample 5 | First Test Method | 4100 |
| Sample 6 | First Test Method | 4000 |
| Sample 7 | First Test Method | Initial Chipping |
| Sample 8 | Second Test Method | 20 |
| Sample 9 | Second Test Method | 15 |
| Sample 10 | Second Test Method | 4 |
| Sample 11 | Second Test Method | 2 |
| Sample 12 | Third Test Method | 1200 |
| Sample 13 | Third Test Method | Initial Chipping |
| Sample 14 | Third Test Method | Initial Chipping |
| Sample 15 | Third Test Method | 1400 |
| Sample 16 | Third Test Method | 2500 |
| Sample 17 | Third Test Method | Initial Chipping |

As described above, while condition A1, condition B1, and condition C1 were satisfied in samples 1, 2, 4 to 6, 8 to 12, 15, and 16, any one of condition A1, condition B1, and condition C1 was not satisfied in samples 3, 7, 13, 14, and 17. From this comparison, it is clear that the tool life of cutting insert 100 is improved by satisfying three conditions: condition A1, condition B1, and condition C1.

Focusing on the samples 8 to 11, the tool lives of the samples 8 and 9 satisfying condition D1 were longer than the tool lives of the samples 10 or 11 not satisfying condition D1. From this comparison, it is clear that the tool life of cutting insert 100 is further improved by further satisfying condition D1.

Focusing on the samples 4 and 5, the tool life of the sample 4 that satisfied condition D2 was longer than the tool life of the sample 5 that satisfied condition D1 but did not satisfy condition D2. From this comparison, it is clear that the tool life of cutting insert 100 is further improved by further satisfying condition D2.

It should be understood that the embodiments disclosed herein are illustrative in all respects and are not restrictive. The basic scope of the present disclosure is defined not by the above-described embodiments but by the claims, and is intended to include meanings equivalent to the claims and all modifications within the scope.

REFERENCE SIGNS LIST 10 substrate, 10a top face, 10b bottom face, 10c side face, 10d attachment portion, 11 through-hole, 20 cutting edge portion, 20a rake face, 20b flank face, 20c cutting edge, 20ca position, 20cb imaginary point, 20cc intersection point, 100 cutting insert, S1 powder preparation step, S2 powder mixing step, S3 sintering step, S4 processing step.

The invention claimed is:

1. A cutting tool comprising a rake face, a flank face, and a cutting edge ridge line connecting the rake face and the flank face,
   wherein each of a portion of the rake face and a portion of the flank face adjacent to the cutting edge ridge line is made of a diamond sintered body including diamond grains, a dislocation density in the portion of the flank face is $7.5 \times 10^{15}/m^2$ or less, the diamond grains have an average grain size of 0.1 μm to 50 μm, and a content ratio of the diamond grains in the diamond sintered body is 80% by volume to 99% by volume.

2. The cutting tool according to claim 1, wherein the dislocation density of the diamond sintered body in the portion of the flank face is $7 \times 10^{15}/m^2$ or less.

3. The cutting tool according to claim 1, wherein the diamond sintered body includes a binder, the binder contains at least one selected from the group consisting of an elemental metal, an alloy, and an intermetallic compound, and each of the elemental metal, the alloy, and the intermetallic compound contains at least one metal element selected from the group consisting of a group 4 element in the periodic table, a group 5 element in the periodic table, a group 6 element in the periodic table, iron, aluminum, silicon, cobalt, and nickel.

4. The cutting tool according to claim 1, wherein the diamond sintered body includes a binder, the binder contains at least one selected from the group consisting of a compound and a solid solution derived from the compound, the compound consists of at least one selected from the group consisting of an elemental metal, an alloy, and an intermetallic compound and at least one selected from the group consisting of nitrogen, carbon, and oxygen, and each of the elemental metal, the alloy, and the intermetallic compound contains at least one metal element selected from the group consisting of a group 4 element in the periodic table, a group 5 element in the periodic table, a group 6 element in the periodic table, iron, aluminum, silicon, cobalt, and nickel.

5. The cutting tool according to claim 3, wherein the binder contains cobalt.

6. The cutting tool according to claim 1, wherein a surface roughness Ra in the portion of the rake face is 120 nm or less.

7. The cutting tool according to claim 1, wherein a dislocation density in the portion of the rake face is $10 \times 10^{15}/m^2$ or less.

8. The cutting tool according to claim 1, comprising a substrate holding the diamond sintered body.

9. The cutting tool according to claim 1, wherein each of an entirety of the rake face and an entirety of the flank face is made of the diamond sintered body.

* * * * *